(No Model.) 2 Sheets—Sheet 1.
J. W. CLOUD.
PIPE COUPLING.
No. 567,735. Patented Sept. 15, 1896.
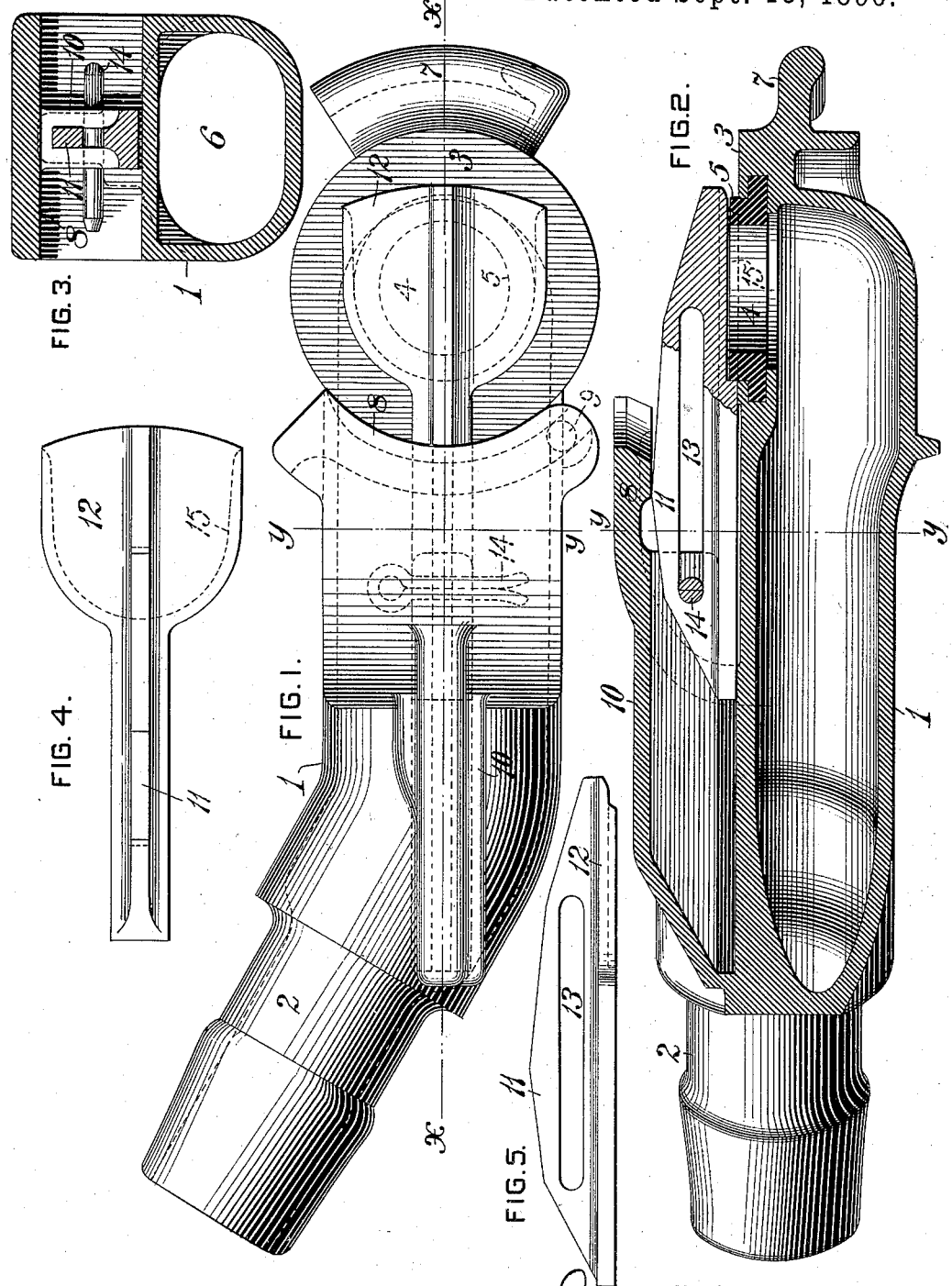
WITNESSES:
T. J. Hogan.
Chas. F. Miller.
INVENTOR,
Jno. W. Cloud,
By J. Snowden Bell,
Att'y.
THE NORRIS PETERS CO., PHOTO-LITHO., WASHINGTON, D. C.

(No Model.) 2 Sheets—Sheet 2.

J. W. CLOUD.
PIPE COUPLING.

No. 567,735. Patented Sept. 15, 1896.

WITNESSES:
T. J. Hogan.
Chas. F. Miller.

INVENTOR
Jno. W. Cloud
by J. Snowden Bell
Att'y.

UNITED STATES PATENT OFFICE.

JOHN W. CLOUD, OF CHICAGO, ILLINOIS, ASSIGNOR TO THE WESTINGHOUSE AIR BRAKE COMPANY, OF WILMERDING, PENNSYLVANIA.

PIPE-COUPLING.

SPECIFICATION forming part of Letters Patent No. 567,735, dated September 15, 1896.

Application filed March 30, 1896. Serial No. 585,486. (No model.)

*To all whom it may concern:*

Be it known that I, JOHN W. CLOUD, a citizen of the United States, residing at Chicago, in the county of Cook and State of Illinois, have invented or discovered a certain new and useful Improvement in Pipe-Couplings, of which improvement the following is a specification.

The object of my invention is to provide means in a detachable pipe-coupling for protecting the opening in the face of a half-section of the coupling against the entrance of dust, dirt, or any objectionable substances, and also to protect the gasket or packing around the opening from injury; and to this end my invention consists in means adapted to operate automatically both to cover and uncover the opening in the face of a half-section of a coupling when uncoupled, which is operated by the action of gravity in both its opening and closing movements, which is simple, durable, inexpensive, and efficient, and which requires no special manipulation or attention when two half-sections of the coupling are being connected or disconnected or at any time before or after the act of coupling or uncoupling.

My improvement is specially adapted to be employed in combination with a section of a detachable coupling composed of two similar detachable half-sections, such as is usually employed in the Westinghouse automatic air-brake system for connecting together the sections of flexible hose at the ends of railway cars, but my improvement is not limited to that or any other special form of coupling, or to a coupling employed for that special purpose, as it will be obvious that, so far as my improvement is concerned, the coupling may be employed for connecting pipes or conduits for the passage of steam or water, and the half-section to which my improvement is applied may be connected to a pipe or hose communicating with a stationary reservoir or pipe.

The improvement claimed is hereinafter fully set forth.

Figure 6:
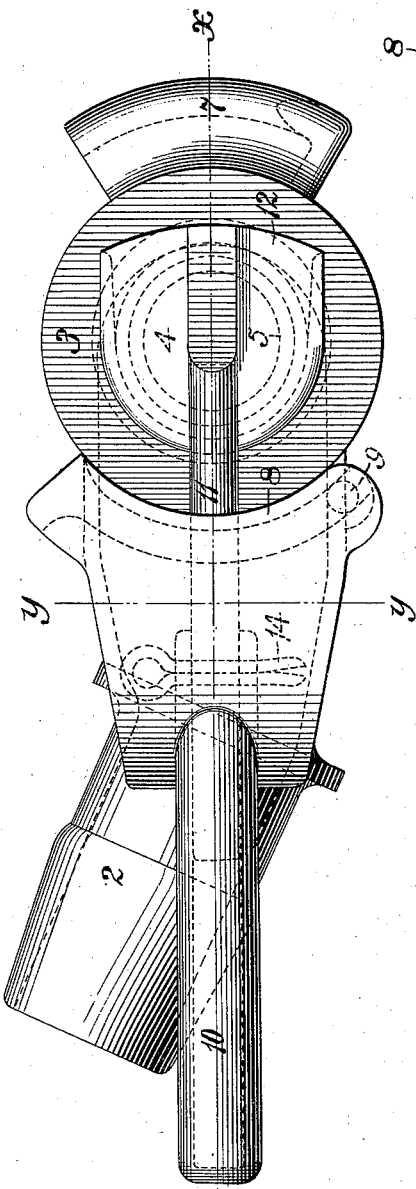
Figure 7:
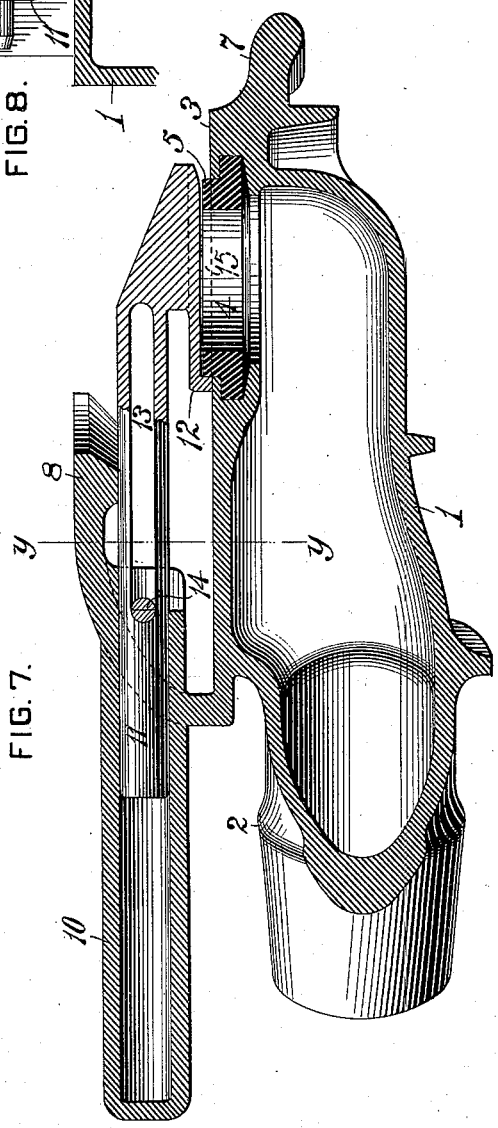

In the accompanying drawings, which illustrate my improvement, Figure 1 is a side elevation of a half-section of a detachable pipe-coupling with my improvement applied thereto; Fig. 2, a longitudinal section through the same at the line $x\,x$ of Fig. 1; Fig. 3, a transverse section on the line $y\,y$ of Figs. 1 and 2; Fig. 4, an elevation of the cover for protecting the opening in the face of the coupling; Fig. 5, a view of the cover, taken at right angles to that shown in Fig. 4; Figs. 6 and 7, views similar, respectively, to Figs. 1 and 2, showing a modification of my improvement; and Fig. 8, a transverse section on the lines $y\,y$ of Figs. 6 and 7.

On railway-cars provided with fluid-pressure brakes or signals, or with a continuous heating system, the sections of flexible hose which connect with the train-pipe at the ends of the cars are each provided at their outer ends with a half-section of a pipe-coupling which is adapted to couple with a similar half-section on the flexible hose of another car, so as to form a continuous conduit throughout the train. The form of coupling usually employed with an automatic fluid-pressure brake system comprises two similar half-sections, each of which is connected at one end to a flexible hose, and near its other end is provided with a lateral opening in its face, the half-section being so constructed and connected that the face through which the opening is made lies in a vertical plane. The lateral opening in each half-section is provided with an annular rubber gasket, and when two half-sections are coupled together the gaskets engage with one another and form a tight joint around the openings.

The sections of flexible hose are usually of such length that when a half-section of a coupling is uncoupled and allowed to swing freely it hangs very near the ground, and if the opening is unprotected dust, dirt, and other substances enter the opening in the face of the coupling, lodge in the cavity or passage within the coupling-shell, and are afterward, when the sections of train-pipe are coupled and charged with fluid, distributed throughout the train-pipe and blown into the passages controlled by the valve mechanism, where they interfere with the proper working of the apparatus.

Heretofore, in order to prevent the entrance of dust and dirt into the coupling and to protect the gasket from injury, it has been the practice to employ a dummy coupling, which was secured to the end of the car, and which was adapted to receive and support the half-section in position to cover, or partly cover, the opening therein. The position of the dummy coupling is such that its employment for the purpose intended causes injurious bending of the hose. Time and attention are required in properly placing the half-section in and removing it from the dummy, and the location of the dummy on opposite sides of the car-couplings of two cars which are coupled together adds to the inconvenience of and the time required for coupling two half-sections. One of the greatest objections to the dummy coupling is the fact that it is seldom used when provided, and the flexible hose is usually allowed to hang down so as to bring the half-section of the coupling near the ground.

My invention is specially adapted to overcome the objections referred to, and comprises simple and efficient means whereby the opening in the coupling is protected from dust and dirt and the gasket from damage, and which is perfectly automatic in its action and requires no attention from the trainmen either in coupling or uncoupling the pipes.

As shown in the drawings, the shell 1 of the half-section is provided with an extension 2, which is adapted to be secured to the outer end of a section of flexible hose, the other end of the hose being connected with the rigid train-pipe under the car. The vertical face 3 of the coupling is provided with a lateral opening 4, surrounded by a gasket 5, which is adapted to form a joint with a similar gasket on another half-section when the two are coupled together. A passage 6, formed in the shell of the half-section and in the extension 2, connects the opening 4 with the interior of the flexible hose.

On the free end of each half-section is formed a flange or projection 7, which is adapted to engage with a hooked portion 8 of another half-section when the two are coupled together. When the parts are coupled together, the central line $x$ $x$ of each half-section lies in a substantially horizontal position, with the lower edge of each of the flanges 7 resting on a stop-pin 9 of the other half-section, and when the parts are uncoupled and allowed to hang down the central line of each half-section assumes a nearly vertical position.

In the embodiment of my invention shown in the drawings, on the back of the hooked portion 8 I provide an extension 10, which is formed integral with the shell, and cored out to form a housing and guide for a sliding stem 11, which is provided with a slot 13, and the movement of which is limited by a pin 14, passing through the housing and through the slot 13 in the stem.

The outer end of the stem 11 is provided with a spatulate extension 12, which forms a valve or cover for protecting the opening 4, and which is adapted to slide over and cover the opening 4 in the face of the half-section when the half-section is uncoupled and the stem and cover are moved outward. A flange 15 extends partly around and projects from the face of the cover 12 toward the face 3 of the half-section, and is of such form that when the valve or cover 12 is over the opening it partly surrounds but does not come in contact with the gasket 5 in the opening 4. The flange 15 on the cover 12 may be so formed that it comes in contact with and slides on the face 3 of the half-section, or, if preferred, the stem 11 may be so fitted in the housing that the flange 15 will be held out of contact with the face 3. Whichever construction is adopted, it is preferred that the cover 12 should be so formed that its inner face does not come in contact with and rub against the edge of the gasket 5. When my improvement is employed in combination with a coupling for automatic fluid-pressure brakes, it is important that the cover 12 when in position over the opening should not fit so closely as to prevent the escape of fluid in sufficient quantity to effect an application of the brakes. When so fitted, the cover may not completely prevent the entrance of very fine dust, but it will permit the entrance of only a very small portion and will totally prevent the entrance of what may be called "dirt" or of other substances composed of any but very fine particles.

When the coupling is employed for other purposes requiring no release of fluid through the opening 4 when the half-sections are separated, the cover 12 may be fitted so as to have no opening when it is in position over the gasket; and I wish it to be understood that my improvement is not limited to a device in which such opening is required, but that the opening in the half-section may be either completely or partially closed to totally prevent or to limit the passage of substances through the opening in the half-section, and, if preferred, the stem 11 and cover 12 may be so fitted as to permit the cover 12 to come in contact with and bear on the gasket 5 when in the closed position. It is, however, essential to the automatic operation of my improvement that it should not be so tightly fitted in any part as to prevent its operation by gravity, as that method of operation is an important feature of my invention.

In Fig. 1 of the drawings the half-section 1 is shown in the position which it occupies when coupled with a similar half-section, the line $x$ $x$ on Fig. 1 being regarded as a horizontal line, but the cover 12 would not then be in the position shown, but would be at or near the extremity of its movement to the left and would occupy a position between the hooked portion 8 and the shell of the half-section, with its outer end to the left of a transverse line through the stop-pin 9, so as to be out of the way of the other half-section with which the section 1 is coupled.

When the half-section 1 is uncoupled and permitted to drop down and swing freely with the hose to which it is attached, as the central line of the stem 11 and cover 12 approaches a vertical position these parts will slide outward until stopped by the pin 14 in the slot 13 and the cover 12 slides over and covers the opening 4 in the face of the half-section.

As is well known, with this form of coupling it is necessary that the half-sections should be brought to an inclined position with their outer ends upward before the two parts can be turned into the locked position, and when in this inclined position the stem 11 slides back into the guide or housing 10 and the cover 12 moves back from the opening 4 and drops into position out of the way of the other half-section.

It will be seen that both the opening and closing movements of the cover 12 are effected entirely by gravity, and that no manipulation of the coupling by the trainman is necessary, except what would be required for the purpose of coupling if my improvement were absent. The person making the coupling does not touch the cover 12 or its stem, is not required to place his hands on the coupling in any particular position, and it is even possible that he may couple and uncouple two half-sections without knowing that they are provided with my improvement.

I am aware that valve devices have been employed for closing the openings through couplings from the outside when the half-sections are uncoupled, but so far as I am aware none of these devices has been automatically operative merely by the usual and necessary movements of the half-sections in the act of coupling and uncoupling. Such devices have been so constructed as to require the employment and manipulation of levers, springs, or catches, which required the attention of and some particular handling by the trainman and involved a comparatively expensive and complicated construction which was easily damaged, and therefore would not be durable if employed in the manner for which my improvement is specially intended.

Figure 8:
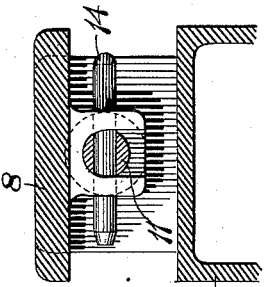

In the construction shown in Figs. 6, 7, and 8, the housing or guide 10 is shown cast integral with the hooked portion 8 of the coupling, but, instead of being joined directly to the shell on its lower side, a space is left between the guide and the shell and the guide projects over the end of the shell. This construction permits the length of the shell to be made somewhat less than is required with the construction shown in Figs. 1 and 2, so that no variation from the standard length of the sections of flexible hose is necessary.

The stem 11 of the cover 12, as shown in Figs. 6, 7, and 8, is cylindrical in form and slotted to permit the passage of the pin 14 through it, and the hole in the guide 10 is also cylindrical, and therefore may be formed with a drill, instead of being cored out. In the drawings, the guide 10 is in each case shown closed at its outer end, but this is not necessary, and, if preferred, the outer end of the guide 10 may be open. The length of the stem 11 to the left of the slot 13 and the length of the guide 10, may be somewhat shortened, so long as a sufficient bearing is secured to properly guide the cover and stem.

For some reasons the construction shown in Figs. 6, 7, and 8 may be preferred to that shown in Figs. 1, 2, 3, 4, and 5; but in the main features of construction they are substantially the same. The shell of the coupling shown in Figs. 6, 7, and 8, in addition to being of the standard size, is much lighter than that shown in Figs. 1 and 2, and the hole or socket in the guide 10 of Figs. 6, 7, and 8 may be more easily and accurately formed than that shown in Figs. 1, 2, and 3.

While my improvement is specially adapted to be employed with couplings which are allowed to swing freely at the end of a car where no coupling-hook or dummy coupling is employed, there is nothing in its construction to prevent its being hung up in such hook or dummy coupling, and in case that practice is preferred no change in the coupling or in my improvement is required. The valve or cover 12 may still be retained, and will operate to perform its function in case the coupling is, by accident or neglect, allowed to hang down or in case the dummy becomes damaged or detached.

I claim as my invention and desire to secure by Letters Patent—

1. The combination, with a half-section of a detachable pipe-coupling, of a sliding valve or cover located outside of the opening in the half-section, which is adapted to be operated by gravity to cover the opening when the half-section is permitted to hang down, and to uncover the opening when the outer end of the half-section is turned upward, substantially as set forth.

2. The combination, with a half-section of a detachable pipe-coupling, of a sliding valve or cover, located outside of the opening in the half-section, which is adapted to operate automatically to cover and uncover the opening, and a guide for controlling the direction of movement of the valve or cover, substantially as set forth.

3. The combination, with a half-section of a detachable pipe-coupling, of a valve or cover, located outside of the opening in the half-section, a guide on the half-section, a stem or extension on the cover which is adapted to slide in the guide, and a stop for limiting the movement of the cover, substantially as set forth.

4. The combination, with a half-section of a detachable pipe-coupling, of a sliding valve or cover, located outside of the opening in the half-section, and means for preventing movement of the cover beyond the edges of the half-section, substantially as set forth.

5. The combination, with a half-section of a detachable pipe-coupling, of a valve or cover located outside of the opening in the half-section and adapted to slide in a plane substantially parallel to the face of the half-section, a guide on the half-section, a stem or extension on the valve or cover which is fitted to slide in the guide, and a pin passing through a slot in the stem or extension, substantially as set forth.

In testimony whereof I have hereunto set my hand.

JNO. W. CLOUD.

Witnesses:
 J. SNOWDEN BELL,
 F. PAPENBROOK.